United States Patent
Cicha et al.

[11] Patent Number: 5,910,297
[45] Date of Patent: Jun. 8, 1999

[54] ALKALINE EARTH FLUORIDE MANUFACTURING PROCESS

[75] Inventors: Walter Vladimir Cicha, Pittsburgh, Pa.; Donald Keith Swanson, Sommerville, N.J.

[73] Assignee: E. I. du Pont de Nemours and Company, Wilmington, Del.

[21] Appl. No.: 09/114,454

[22] Filed: Jul. 13, 1998

Related U.S. Application Data

[60] Provisional application No. 60/054,404, Jul. 31, 1997.

[51] Int. Cl.$^6$ .................................. C01F 5/28; C01F 11/22
[52] U.S. Cl. ............................ 423/490; 423/332; 423/341
[58] Field of Search ................................. 423/332, 341, 423/490, 497

[56] References Cited

U.S. PATENT DOCUMENTS

| | | | |
|---|---|---|---|
| 3,549,317 | 12/1970 | Dorn et al. | 423/497 |
| 3,907,978 | 9/1975 | Spreckelmeyer | 423/490 |
| 3,956,147 | 5/1976 | Becker et al. | 423/490 |
| 4,031,193 | 6/1977 | Becker et al. | 423/490 |
| 4,171,342 | 10/1979 | Hirko et al. | 423/490 |
| 4,264,563 | 4/1981 | Sikdar | 423/490 |
| 4,414,185 | 11/1983 | Mollere et al. | 423/490 |
| 5,447,637 | 9/1995 | Barber | 423/332 |
| 5,531,975 | 7/1996 | Erickson et al. | 423/490 |

OTHER PUBLICATIONS

Abstract of SU 1325018, Jul. 1987.
Abstract of SU 767032, Sep. 1980.

*Primary Examiner*—Ngoc-Yen Nguyen

[57] ABSTRACT

A process suitable for producing high purity alkaline earth fluoride product is disclosed which involves (a) mixing (i) MgO, CaO, BaO, Mg(OH)$_2$, Ca(OH)$_2$, and/or Ba(OH)$_2$, (ii) NaOH, KOH and/or NH$_4$OH, and (iii) water, to form an aqueous slurry having a temperature of at least 20° C. and an aqueous phase pH of at least 13; (b) adding fluosilicic acid, optionally adding additional water and optionally adding additional NaOH, KOH and/or NH$_4$OH to the slurry of (a) at a rate which maintains an aqueous phase pH of 11 or above, and in an amount to provide a molar ratio of Si:(Mg, Ca, and Ba) of at least 1:3.3, a molar ratio of (Na, K, and NH$_4$):Si of at least 2:1, and a molar ratio of water:Si of at least 20:1, and to obtain a precipitate comprising an alkaline earth fluoride (MgF$_2$, CaF$_2$ and/or BaF$_2$), and an aqueous solution of a soluble silicon anionic compound; and (c) recovering the alkaline earth fluoride product.

4 Claims, No Drawings

ALKALINE EARTH FLUORIDE MANUFACTURING PROCESS

This application claims the priority benefit of U.S. Provisional Application 60/054,404, filed Jul. 31, 1997.

FIELD OF THE INVENTION

This invention relates to a process for the manufacture of magnesium fluoride, calcium fluoride or barium fluoride and more particularly to its production by the reaction of fluosilicic acid (i.e., $H_2SiF_6$ or FSA) with the oxide or hydroxide of magnesium, calcium or barium, and the hydroxide of sodium, potassium or ammonium.

BACKGROUND

Fluorine, the essential element for fluorochemicals and fluoropolymers, is currently derived from fluorospar, a mineral which is a crystalline form of calcium fluoride. Reserves of fluorospar are rapidly being depleted. Furthermore, the United States currently imports about 90% of its supply.

An important reserve of fluorine is contained in fluoroapatite, $CaF293 \cdot Ca_3(PO_4)_2$, a mineral which is used for the manufacture of phosphoric acid. This mineral constitutes a reserve which is about four times greater than the proven reserves of fluorospar. During the manufacture of phosphoric acid most of the fluorine is removed as fluosilicic acid (FSA). There is some demand for FSA for fluoridating drinking water, for the manufacture of cryolite and aluminum fluoride. However, since this demand is small, most of the fluorine produced during phosphoric acid manufacture is sent to a waste-water pond. This can cause a fluorine pollution problem.

Over the years numerous processes, several of which are described below, have been developed to recover the fluorine from phosphate minerals. The United States Bureau of Mines (Chem. Abst., 75:23270, 1971) has shown how waste fluosilicic acid can be converted to an acid-grade fluorospar ($CaF_2$). A first step involves treating the FSA with ammonia to precipitate silica, which is removed by filtration, and form $NH_4F$. In a second step ammonium fluoride is treated with lime to form $CaF_2$.

U.S. Pat. No. 3,549,317 discloses a process for the preparation of a silica filler and a calcium fluoride from FSA or sodium fluosilicate in water. The fluosilicate is reacted with calcium carbonate at a temperature above 50° C. until evolution of $CO_2$ stops, at which point calcium fluoride and a silica material is formed. The silica is dissolved in sodium hydroxide at temperatures of 50° C. to the mixture's boiling point and the calcium fluoride is then removed by precipitation.

U.S. Pat. No. 4,264,563 describes a process for the preparation of a calcium fluoride-containing solid in which a fluorosilicate-containing material is added to a heated suspension of lime in water.

U.S. Pat. No. 5,531,975 describes a process for reacting phosphate rock and PSA to produce a slurry comprising phosphoric acid, calcium fluoride, silicon dioxide and undigested phosphate rock.

There is still a need for an efficient commercial process for preparing useful fluorine containing materials such as calcium fluoride from FSA.

SUMMARY OF THE INVENTION

This invention provides a process for producing an alkaline earth fluoride product. The process comprises (a) mixing (i) a first base component selected from the group consisting of compounds of the formula AO, compounds of the formula $A(OH)_2$, and mixtures thereof, where A is selected from the group consisting of Mg, Ca and Ba, (ii) a second base component selected from the group consisting of compounds of the formula MOH and mixtures thereof, where M is selected from the group consisting of Na, K and NH4, and (iii) water, to form an aqueous slurry having a temperature of at least 20° C. and an aqueous phase pH of at least 13; (b) adding fluosilicic acid (i.e., $H_2SiF_6$ or FSA), optionally adding additional water and optionally adding additional second base component to the slurry of (a), said addition being at a rate which maintains an aqueous phase pH of 11 or above, and in an amount to provide a molar ratio of Si:A of at least 1:3.3, a molar ratio of M:Si of at least 2:1, and a molar ratio of water:Si of at least 20:1, and to obtain a precipitate comprising an alkaline earth compound of the formula $AF_2$, and an aqueous solution of a soluble silicon anionic compound; and (c) recovering the alkaline earth fluoride product.

DETAILED DESCRIPTION

The process of this invention may be used to provide high purity alkaline earth fluoride product. Of note are embodiments where A consists essentially of Ca such that high purity $CaF_2$ is recovered.

The fluosilicic acid reactant useful for this alkaline earth fluoride process may be any grade which is commercially available. For example, reagent grade FSA solution which contains from about 5% to 30% by weight $H_2SiF_6$ or the process pond water from phosphoric acid production which typically contains up to 5% fluorine can be used in the process of this invention.

The alkaline earth compounds useful for this process include MgO, CaO, BaO, $Mg(OH)_2$, $Ca(OH)_2$ and $Ba(OH)_2$. The MOH compound(s) (e.g., sodium hydroxide) may be added as a solid or as an aqueous solution. The alkaline earth compound is used in an aqueous basic solution. NaOH and KOH are generally the preferred MOH compounds. Indeed, for some embodiments if the pH of the solution is less than 13, then KOH and/or NaOH (rather than $NH_4$ H) may be required to provide the step (a) pH of at least 13.

The molar ratio of the alkaline earth metal, A, to Si is typically from about 2.9:1 to 3.3:1, and is preferably about 3.05:1. The molar ratio of alkali metal M (from MOH) to Si is typically from about 2.0:1 to 2.4:1, and is preferably about 2.10:1. The molar ratio of water to Si is typically from about 20:1 to 400:1, and is preferably from about 60:1 to 100:1.

Typically, a slurry suspension of the alkaline earth compound and MOH in water at a pH of about 13 to 14 is prepared. Stirring may be used during slurry formation. The heats of dilution associated with mixing the bases with water causes the temperature to rise, typically to from about 40° C. to 70° C. The slurry may optionally be cooled (e.g., with stirring), but a temperature of about 20° C. or more should be maintained. An aqueous solution of fluosilicic acid, wherein the concentration of FSA is about 5 weight % to about 30 weight % (preferably about 25 weight %) may be used to add the FSA. Normally, the FSA is slowly added to the suspension until the pH of the solution is lowered to about 11. It is preferred to continue heating and stirring at 50° C. after a pH of 11 has been reached to aid in the digestion of any silica precipitate (and possibly to promote the formation of larger, more easily filtered crystals in the product) but this is not essential.

Of note are embodiments where the first base component is CaO and/or $Ca(OH)_2$ and the alkaline earth fluoride product is high purity CaF$_2$. At a pH of 11 greater than 85% by weight of the precipitate formed is commonly calcium fluoride.

The addition rate of the FSA solution is typically controlled so that the temperature does not exceed about 95° C.

The alkaline earth fluoride product (e.g., CaF$_2$ or MgF$_2$) may be recovered by any solid-liquid separation technique such as filtration, decantation or centrifugation. Filtration may be done using the hot slurry, or the mixture may be cooled prior to the separation. The reaction and separation steps can be operated either in batch or continuous modes. Recovery may include washing using standard techniques (e.g., with water following initial filtration, centrifugation or decantation).

The alkaline earth fluoride product (e.g., CaF$_2$ or MgF$_2$) contains at least about 85% by weight of the alkaline earth fluoride, preferably at least about 95% of the alkaline earth fluoride and most preferably at least about 99% of the alkaline earth fluoride. Of note are embodiments where calcium fluoride product is produced which contains at least about 85% by weight CaF$_2$, preferably at least about 95% CaF$_2$ and most preferably at least about 99% CaF$_2$.

The process of this invention provides a means for producing a calcium fluoride product which does not require the elaborate silica separation steps described in the art since the silicon is removed as an aqueous solution of a soluble silicate. The soluble silicate can be used for other applications such as in the preparation of colloidal silica. Also, because of the absence of silica gel or sol, filtration of the solids is accelerated.

Without further elaboration, it is believed that one skilled in the art can, using the description herein, utilize the present invention to its fullest extent. The following specific embodiments are, therefore, to be construed as merely illustrative, and does not constrain the remainder of the disclosure in any way whatsoever.

EXAMPLES

Example 1

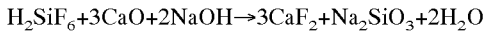

Step 1. CaO (58.4 g) and aqueous 50% NaOH (58.9 g) were added to deionized water (150 g) in a 1 liter glass beaker. The heat of dilution of the bases in water caused the temperature of this basic mixture to increase from ambient (about 28° C.) to about 55° C. The mixture was stirred with a Teflon® paddle and cooled to 50° C. (In this reaction, a stoichiometric amount of CaO was intended to be used based on the amount of fluosilicic acid used in step 2. It was later observed that when this CaO powder was heated to 900° C. for 30 minutes that it had a 4% weight loss. Therefore, 60.8 grams should have been used and this deficiency is expected to negatively affect the reported observed yield.)

Step 2. Aqueous 25% fluosilicic acid (200 g) was charged to a dropping funnel and positioned to discharge about midway between the center and wall of the beaker. When the mixture of Step (1) reached 50° C., FSA addition was started. The FSA solution was added at a rate of about 20 grams/minute. During the addition the maximum temperature observed was about 88° C.

Step 3. The precipitate of the slurry was isolated on a filter and washed with deionized water according to the profile given in Table 1. The pH of the wash water was about 10 after the final wash. The total wash time was about 6.5 hours.

TABLE 3

| Wash Water | Ionic Conductance ($\mu$S) | pH |
|---|---|---|
| 2.0 liters | 13,000 | 13.0 |
| 4.0 liters | 1,675 | 11.5 |
| 6.0 liters | 1,100 | 11.0 |
| 8.0 liters | 560 | 10.0 |

Step 4. The washed precipitate was oven dried at 120° C. The observed dry powder yield was 90.3 g.

An X-ray diffraction (XRD) pattern of the powder indicates that it is mainly CaF$_2$ with a trace of CaCO$_3$ present. The crystallite size of the CaF$_2$ powder was estimated to be 352 Angstroms using a standard X-ray line broadening method.

A series of standards using CaF$_2$ (99.9%) and Na$_2$SiO$_3$ were prepared for analysis using X-ray fluorescence spectrometry. These standards ranged in CaF$_2$ concentration from 80 to 100 weight % and in Na$_2$SiO$_3$ concentration from 0 to 20 weight %. The powder mixes were fused in platinum crucibles using a lithium borate flux. The fused glass discs were then analyzed to generate the intensity vs. concentration curves for Na$_2$O, SiO$_2$, and CaF$_2$. The powder was then fused to a glass disc and measured. The results obtained were Na$_2$O=1.5%, SiO$_2$=9.7%, and CaF$_2$=85.2%.

We claim:

1. A process for producing an alkaline earth fluoride product, comprising:

(a) mixing (i) a first base component selected from the group consisting of compounds of the formula AO, compounds of the formula A(OH)$_2$, and mixtures thereof, where A is selected from the group consisting of Mg, Ca and Ba, (ii) a second base component selected from the group consisting of compounds of the formula MOH and mixtures thereof, where M is selected from the group consisting of Na, K and NH4, and (iii) water, to form an aqueous slurry having a temperature of at least 20° C. and an aqueous phase pH of at least 13;

(b) adding fluosilicic acid, optionally adding additional water and optionally adding additional second base component to the slurry of (a), said addition being at a rate which maintains an aqueous phase pH of 11 or above, and in an amount to provide a molar ratio of Si:A of at least 1:3.3, a molar ratio of M:Si of at least 2:1, and a molar ratio of water:Si of at least 20:1, and to obtain a precipitate comprising an alkaline earth compound of the formula AF2, and an aqueous solution of a soluble silicon anionic compound; and (c) recovering the alkaline earth fluoride product.

2. The process of claim 1 wherein M is selected from the group consisting of Na, K and mixtures thereof.

3. The process of claim 2 wherein in (b) fluosilic acid is added in an amount to provide a molar ratio of A: Si of from about 2.9:1 to 3.3:1.

4. The process of claim 3 wherein the first base is selected from the group consisting of CaO, Ca(OH)$_2$ and mixtures thereof, and a calcium fluoride product containing at least about 85% by weight CaF$_2$ is produced.

* * * * *